United States Patent [19]

Charlebois et al.

[11] 4,152,539

[45] May 1, 1979

[54] TELECOMMUNICATION CABLE SPLICES

[75] Inventors: Leonard J. Charlebois, Hazeldean; Terence A. Ashby, Carleton Place, both of Canada

[73] Assignee: Northern Telecom Limited, Montreal, Canada

[21] Appl. No.: 844,315

[22] Filed: Oct. 21, 1977

[51] Int. Cl.² .............................................. H01R 3/02
[52] U.S. Cl. ..................................... 174/72 R; 156/49; 174/88 R
[58] Field of Search ................. 174/71 R, 72 R, 88 R; 156/49, 51

[56] References Cited

U.S. PATENT DOCUMENTS

| 3,795,757 | 3/1974 | Higgins | 174/72 R |
| 4,025,717 | 5/1977 | Whittingham | 156/49 X |

*Primary Examiner*—Thomas J. Kozma
*Attorney, Agent, or Firm*—Sidney T. Jelly

[57] ABSTRACT

The invention provides an air tight and water tight seal around a telephone cable that has been opened and has a number of pairs selected and spliced to wires or cables exiting from the splice. The seal extends over and around the cables exiting from the spliced joint. This is accomplished by encapsulating the cable with a molten material which seals to the cable sheaths.

3 Claims, 5 Drawing Figures

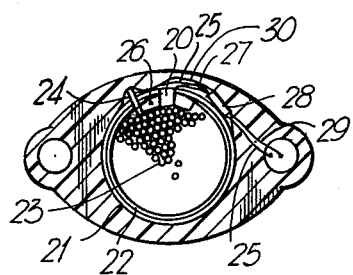
Fig-3
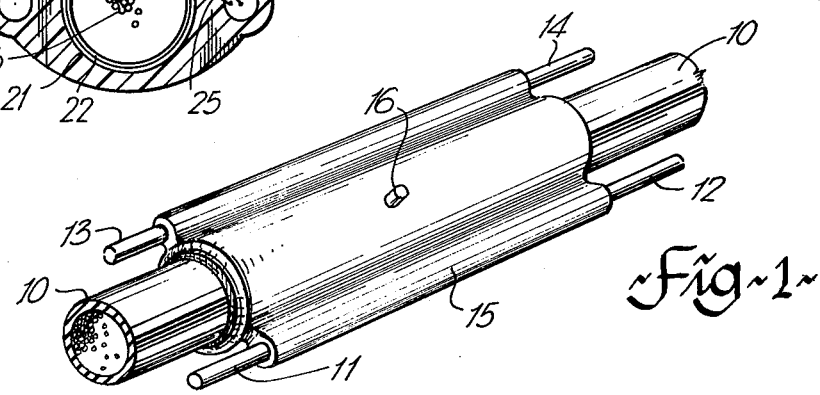
Fig-1
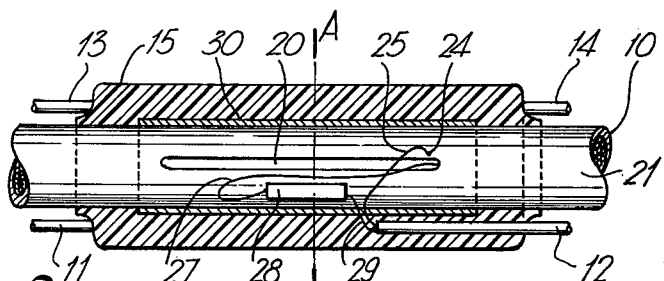
Fig-2
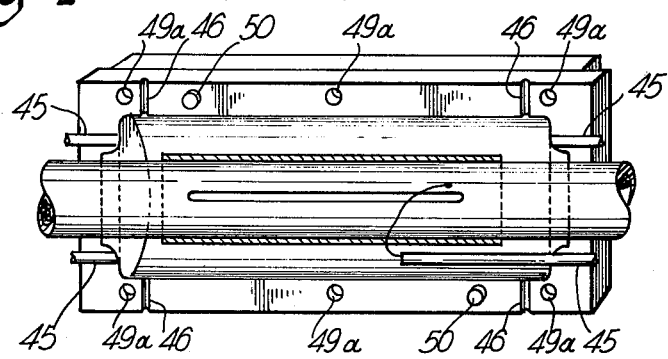
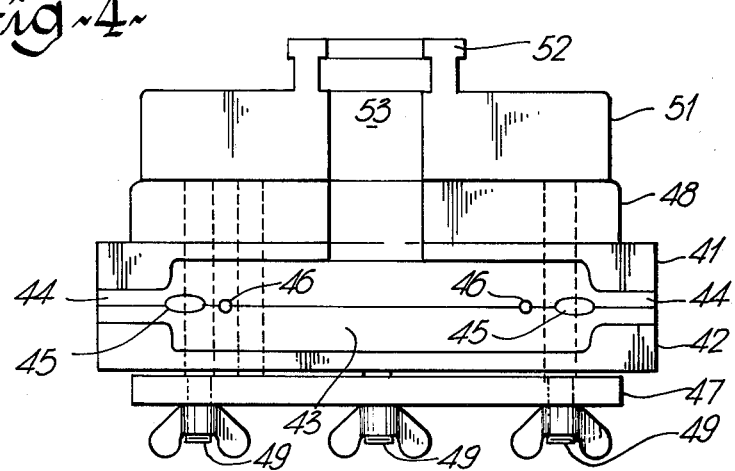
Fig-4
Fig-5

TELECOMMUNICATION CABLE SPLICES

This invention relates to splices in telephone cables and more particularly to encapsulation of splices using low pressure injection molding techniques.

A telephone distribution system from the central office to the subscribers has the general form of a tree network. A tree network comprises a main trunk which divides into a number of main branches which further subdivide into branches and thence into sub-branches. This process may carry on for many further subdivisions and in the telephone network often does. The main trunk in the telephone network is a number of multi-thousand pair of cables that run out of the central office. These trunks, depending on their length, may include splices with no division. The cables branch numerous times before the final branch, the customer drop wire, branches off. Each of the branching points or nodes necessitates splicing one cable to another, a pair at a time.

Currently the opened cables, once the wires are spliced in place, are wrapped with many layers of sealing tape and closed in with a heat shrinkable split sleeve. The splice is baked to melt the tapes and shrink then onto the cables and exiting wires.

Prior to the above system, and still in use in some areas, the cable opening was taped and a split sleeve was placed around the cable. The ends of the split sleeve were sealed with a number of layers of sealing tape. The sleeve was then flooded with a pouring type encapsulating sealant, such as polyurethane.

The invention provides an air tight and water tight seal around a telephone cable that has been opened and has a number of pairs selected and spliced to wires or cables exiting from the splice. The seal extends over and around the cables exiting from the spliced joint. This is accomplished by encapsulating the cable with a molten plastic material which seals to the cable sheaths.

The advantages of the invention are that it provides a seal that is not as susceptible to the possibility of human error as can be expected when applying several layers of tape, because the encapsulation is injected by machine, and in certain circumstances a bonding occurs between the injected plastic and the cable sheath. Cost per splice can be greatly reduced.

The physical size of the sealed splice is much smaller than the current system, allowing for easier handling of the cables and splices, and the splice can easily be made in the field as well as in a factory setting.

The invention is accomplished by using an injection molding die with a mold cavity specifically designed to hold the various wires and cables. The mold cavity has an air space around the cables and wires. This air space is filled with the molten plastic material injected under low pressure. The mold cavity has small ports exiting from the die that allows air and the molten plastic to exit from the cavity. This allows the injected material to wash the surfaces of the cables and wires and ensures a seal between the injected material and the cables wire sheaths. The injection gun is removed and a pressure ram is attached to the mold. During the cooling period, the splice is kept under pressure to ensure a good seal.

The invention will be better understood with reference to the following diagrams for example in which:

FIG. 1 is a perspective view of a completed four drop wire splice;

FIG. 2 is a partial cross-section of the splice of FIG. 1;

FIG. 3 is a cross-section along the line A—A of FIG. 2;

FIG. 4 is a plan view of one half of the mold;

FIG. 5 is a cross-section of the mold.

As illustrated in the drawings, the four drop wires 11, 12, 13 and 14 emerge from the encapsulation 15 parallel to the main cable 10. Pip 16 is the remnant of the injection point and may be removed at a later date.

A long slit 20 is made through the outer sheath 21 and the metallic sheath 22 for access to the inner cable pairs 23. A ground lug 24 is installed through both the outer sheath 21 and the metallic sheath 22 with electrical connections to the metallic sheath 22. A ground wire 25 from drop wire 12 is connected to the ground lug 24. Ground wires are likewise connected from the other drop wires 11, 13 and 14. Each drop wire is cut to give seven or eight inches of slack. A polyethylene liner 26 is installed in the slit opening 20 between the cable pairs 23 and the metallic sheath, with the selected pair 27 exiting through a hole in the liner 26. Pair 27 is spliced, using splice element 28, to the pair of conductors 29 comprising drop wire 12. Drop wires 11, 13 and 14 are connected to other pairs from the main cable 10 in a likewise manner. The entire area except the drop wires 11, 12, 13 and 14 is wrapped in a layer of tape 30 to secure the splices to the main cable 10.

The mold is comprised, for example, of two plexi-glass layers 41 and 42 each which is hollowed out to form one half of the mold cavity 43. Extensions 44 of the cavity hold the main cable, having an inner diameter corresponding to the outer diameter of the main cable. Likewise extension 45 hold the drop wires. Ports 46 are provided to allow air and molten plastic to escape and to ensure that a seal occurs between the cable sheath and the molten plastic.

The two halves of the mold 41 and 42 are sandwiched together between base plate 47 and top plate 48. The unit is held together by release bolt and wing nut combinations 49 which extend through bolt holes 49a. Alignment pins 50 assure proper mating of the two plexi-glass layers 41 and 42. Attached to top plate 48 is plate 51 which contains the bayonet type attachment 52 for the attachment of the injection molding gun. The injection port 53 runs centrally through the plate 51, the top plate 48 and the top layer 41 to allow the injected plastic to enter the mold cavity.

One of the major problems that the present invention overcomes is the problem of a good seal to cables that have polyethylene sheaths. The adhesive used with tapes does not bond well to polyethylene and a poor moisture barrier can exist. The same problem is true of pouring type encapsulants as they must be poured at normal temperatures that are well below the temperature at which polyethylene will bond.

The use of molten polyethylene as the encapsulant obviates the above problems. The temperature of the polyethylene encapsulant is such approximately 300° C. that the cable sheath melts and a bond occurs between the polyethylene sheath and encapsulant.

What is claimed is:

1. In a telecommunication cable a splice comprising:
a first cable with a slit through an outer plastic sheath and inner metallic sheaths to provide access to inner conductors;
a second cable, with an outer plastic sheath and inner metallic sheaths removed from a portion of the end of the second cable to provide access to the inner conductors;

a ground lug connected through the sheaths of said first cable and providing electrical contact to said metallic sheath of said first cable;

a first connection between said ground lug and one of said inner conductors of said second cable provided for grounding purposes;

a second connection between a first pair of conductors from said first cable and a second pair of conductors from said second cable;

a plastic liner inserted into said slit to cover said inner conductors, said first pair of conductors protruding through an opening in said liner;

a layer of sealing tape surrounding said first cable and connections to provide support therefor;

a molded encapsulation of plastic material surrounding said wrapped portion and surrounding portions of said first and second cables encompassing an area of undisturbed sheath on each cable;

the plastic material forming a moisture proof and air proof seal with the said cable sheaths.

2. In a splice, as claimed in claim 1, wherein the plastic encapsulant material is polyethylene, and said cable sheaths are of polyethylene, and the polyethylene encapsulant is bonded to the cable sheaths.

3. In a splice, as claimed in claim 1, including four of said second cables, each of said second cables connected to a separate pair of inner conductors of said first cable.

* * * * *